United States Patent [19]

Olschewski et al.

[11] Patent Number: 4,534,095
[45] Date of Patent: Aug. 13, 1985

[54] CAGE FOR ROLLING BEARINGS

[75] Inventors: Armin Olschewski, Schweinfurt; Bernhard Bauer, Hassfurt, both of Fed. Rep. of Germany

[73] Assignee: SKF Kugellagerfabriken GmbH, Schweinfurt, Fed. Rep. of Germany

[21] Appl. No.: 550,300

[22] Filed: Nov. 9, 1983

[30] Foreign Application Priority Data

Sep. 11, 1982 [DE] Fed. Rep. of Germany ... 8231303[U]

[51] Int. Cl.³ .............................................. B21H 1/12
[52] U.S. Cl. ................................................ 29/148.4 C
[58] Field of Search ............. 308/217, 218, 202, 201, 308/207 R, 207 A; 29/148.4 C, 149.5 DP

[56] References Cited

U.S. PATENT DOCUMENTS 2,933,803 4/1960 Schaeffler ...................... 29/148.4 C
3,445,907 5/1969 Greby ............................. 29/148.4 C
3,992,764 11/1976 Serasio ........................... 29/148.4 C
4,222,620 9/1980 Mirring ................................. 308/217
4,425,011 1/1984 Cunningham et al. ............. 308/217

FOREIGN PATENT DOCUMENTS 296217 8/1928 United Kingdom .

Primary Examiner—Lenard A. Footland
Attorney, Agent, or Firm—Daniel M. Rosen

[57] ABSTRACT

In a cage for rolling bearings, the material of the webs is forced into the cage pockets on the outer surface of the cage, to hold the rolling bodies from falling out of the pockets radially outwardly of the cage. The material of the webs is also formed to provide the projections extending perpendicularly from the inner surface of the webs, in order to inhibit falling out of the rolling bodies radially inwardly of the cage pockets.

1 Claim, 2 Drawing Figures

CAGE FOR ROLLING BEARINGS

This Invention relates to a cage for rolling bearings, and is more particularly directed to a cage having means for inhibiting the bearings from falling out of the cage.

A cage of this type is disclosed, for example, in U.K. Pat. No. 296,217. In this arrangement the rolling bodies are prevented from falling out by radially outwardly disposed holding projections. These projections are formed out of the material of the webs by a pressing tool positioned outwardly of the center line of the webs. The pressing tool has a head which is rounded on all sides, resulting in a depression in the web upon the application of high pressing force, so that the material of the web is partly compressed and flows in and around the rounded head of the pressing tool on both sides in the circumferential direction of the cage in the region of the cage pockets. This results in the production of holding projections which advantageously embrace the surface of the rolling bodies on the outer surface of the cage in the circumferential direction.

On the radial inner portion of the cage, displacement of the material results upon the application of higher compression, so that in this manner the holding projections are formed to approximately fit the outer surface of the rolling bodies.

The known cage is provided with such holding projections only on its surface, so that the rolling bodies can fall out inwardly from their pockets if, for example, the inner ring of the bearing is removed. If this type of holding projection is also provided on the bore surface of the cage, then it is necessary for the cage to have a relatively large wall thickness, in which case it suffices to arrange the rolling bodies on both sides of the pitch circle, so that the formed projections can also adequately embrace the outer surface of the rolling bodies. In the case of relatively thin-walled cages, however, holding projections formed on the inside and outside of the cage do not adequately hold the rolling bodies in the above known method.

It is therefore the object of this invention to provide a cage for rolling bearings in which holding projections may be provided also in cages having smaller wall thickness and web width, while still inhibiting the rolling bodies against falling out both in the radially inner as well as in the radially outer directions.

In accordance with the invention this object is achieved by providing a cage in which each web is provided with at least one vertically directed holding projection pressed from the web by the tool employed for forming the horizontally extending holding projections. Preferably thereby first holding projections are pressed out radially with respect to the web and second holding projections are formed to extend circumferentially into the cage pockets. The pressed-out projections have the same width in the circumferential direction as the webs, so that due to the circular shape of the cage and also the parallel side surfaces of the holding projections the rolling bodies are partially embraced and insured against falling out radially inwardly.

The pressing tool is so formed that the web material on both sides of the adjoining cage pockets is deformed on the outer surface of the cage and forms projections inhibiting the rolling bodies from falling radially outwardly. Advantageously in accordance with the invention a relatively thin-walled cage, for example, made of sheet metal with very small webs, can be used for the holding projections.

In one embodiment of the invention it is especially advantageous if the center point of the rolling bodies is arranged on the corresponding pitch circle at the inner diameter of the cage.

As a result the rolling bodies are optimally embraced by the outer as well as by the inner holding projections, so that the best insurance against falling out of the rolling bodies both radially outwardly and radially inwardly exists under the conditions.

The invention may be satisfactorily employed both in radial ball bearings and axial ball bearings.

In order that the invention will be more clearly understood, it will now be disclosed in greater detail with reference to the accompanying drawings.

Figure 1:
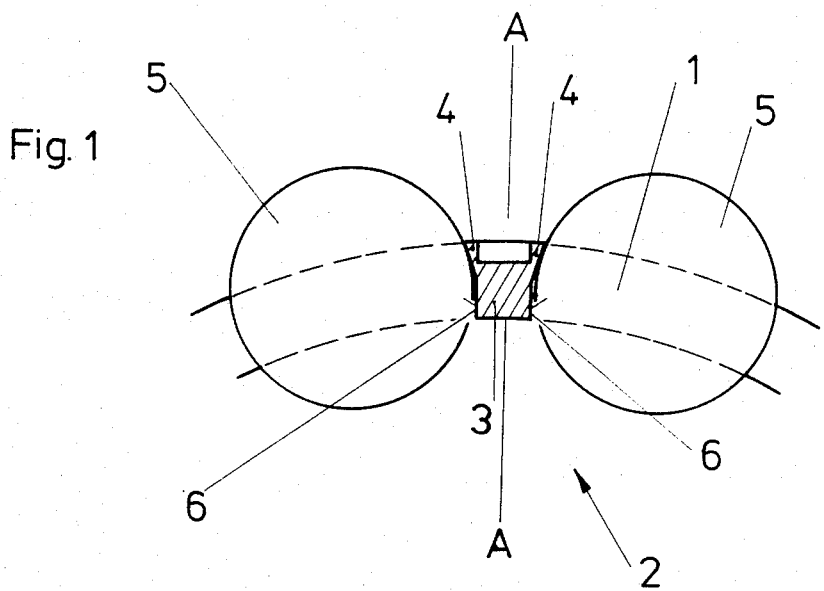
FIG. 1 is a partial side view of a cage for cylindrical roller bearings, in which the side ring and one web in the region of the holding projections are shown in section.
Figure 2:
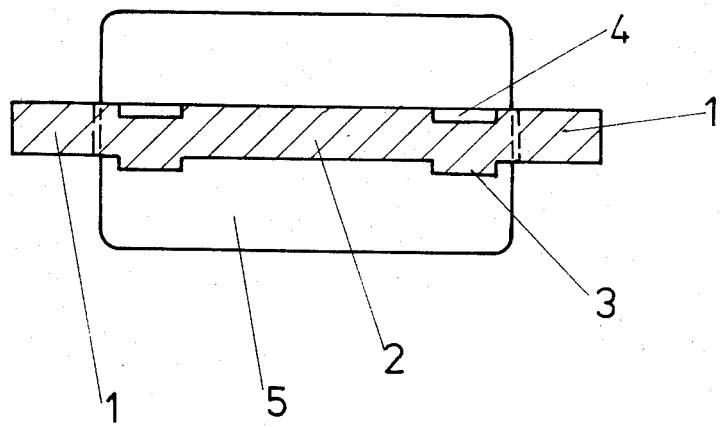
FIG. 2 is a partial longitudinal section of the cage illustrated in FIG. 1, taken along the section A—A.

The cage illustrated in FIGS. 1 and 2 is produced, for example, from a thin-walled tube section. A simple cylindrical cage structure is formed having narrow webs 2 extending between a pair of side rings 1, in a single piece, by the stamping free of the cage pockets. The cylindrical rollers 5 of the bearing are insured against falling out of the cage, both in the radially inner and outer directions, by forming holding projections 3, 4 out of the webs 2 of the cage in the regions of the cylindrical rollers 5. The material of the webs 2 is radially inwardly stamped by means of a stamping tool (not shown) which is arranged at the radially outside of the cage at the centers of the width of the webs, so that radially inwardly extending holding projections 3 are produced. These holding projections 3 inhibit the respective adjoining cylindrical rollers 5 from falling radially inwardly out of the cage. The head of the stamping tool is so formed that the outer surfaces of the webs 2 on both sides are pushed out in the circumferential direction in the region of the cage pockets at the same time as the stamping of the inwardly directed holding projections 3. This results in the production of the outer holding projections which inhibit the cylindrical rollers 5 of the bearing from falling radially outwardly.

While the invention has been disclosed and described with reference to a single embodiment, it will be apparent that variations and modifications can be made therein, and it is therefore intended in the following claims to cover each such variation and modification as falls within the true spirit and scope of the invention.

What is claimed is:

1. A method for holding rolling elements in a bearing cage of sheet metal in which cage pockets embracing the rolling elements are separated by webs, said method comprising stamping the outer surface of said webs at their centerlines to deform the material thereof to extend into said cage pockets at said outer surface and to deform the material thereof to form projections extending vertically from the inner surface of said webs, whereby the deformed material inhibits the rolling elements from falling out of the respective cage pockets.

* * * * *